United States Patent
Ohira et al.

(10) Patent No.: US 12,248,188 B2
(45) Date of Patent: Mar. 11, 2025

(54) SEMICONDUCTOR DEVICE

(71) Applicant: KABUSHIKI KAISHA TOSHIBA, Tokyo (JP)

(72) Inventors: Kazuya Ohira, Nerima (JP); Hideto Furuyama, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 167 days.

(21) Appl. No.: 17/821,584

(22) Filed: Aug. 23, 2022

(65) Prior Publication Data
US 2023/0288651 A1 Sep. 14, 2023

(30) Foreign Application Priority Data
Mar. 10, 2022 (JP) .................. 2022-036874

(51) Int. Cl.
*G02B 6/42* (2006.01)
(52) U.S. Cl.
CPC ......... *G02B 6/4206* (2013.01); *G02B 6/4245* (2013.01)
(58) Field of Classification Search
None
See application file for complete search history.

(56) References Cited

U.S. PATENT DOCUMENTS 5,960,141 A * 9/1999 Sasaki .................... G02B 6/428
385/88

FOREIGN PATENT DOCUMENTS

| JP | 11-500239 A | 1/1999 |
|---|---|---|
| JP | 2012-168563 A | 9/2012 |
| JP | 2014-48630 A | 3/2014 |
| JP | 2015-219267 A | 12/2015 |
| JP | 2020-181045 A | 11/2020 |

OTHER PUBLICATIONS

Japanese Office Action issued Aug. 27, 2024 in Japanese Application 2022-036874, (with unedited computer-generated English translation), 5 pages.
Office Action issued Nov. 21, 2024 in Japanese Patent Application No. 2022-036874, citing document 15 therein, along with computer generated English translation.

* cited by examiner

*Primary Examiner* — Jerry Rahll
(74) *Attorney, Agent, or Firm* — Oblon, McClelland, Maier & Neustadt, L.L.P.

(57) ABSTRACT

A semiconductor device includes a substrate; a holding member located on the substrate, the holding member including a module placement part and an opening arranged in a first direction; an optical module located in the module placement part and mounted on the substrate; and an optical fiber passing through the opening, the optical fiber being connected with the optical module. The holding member includes a first corner part and a second corner part. The opening is between the first corner part and the second corner part in a direction crossing the first direction. The first corner part and the second corner part are beveled.

10 Claims, 3 Drawing Sheets

SEMICONDUCTOR DEVICE

CROSS-REFERENCE TO RELATED APPLICATION

This application is based upon and claims the benefit of priority from Japanese Patent Application No. 2022-036874, filed on Mar. 10, 2022; the entire contents of which are incorporated herein by reference.

FIELD

Embodiments described herein relate generally to a semiconductor device.

BACKGROUND

Conventionally, an optical fiber is protected by mounting a boot to the end part of the optical fiber.

DETAILED DESCRIPTION

Figure 1:
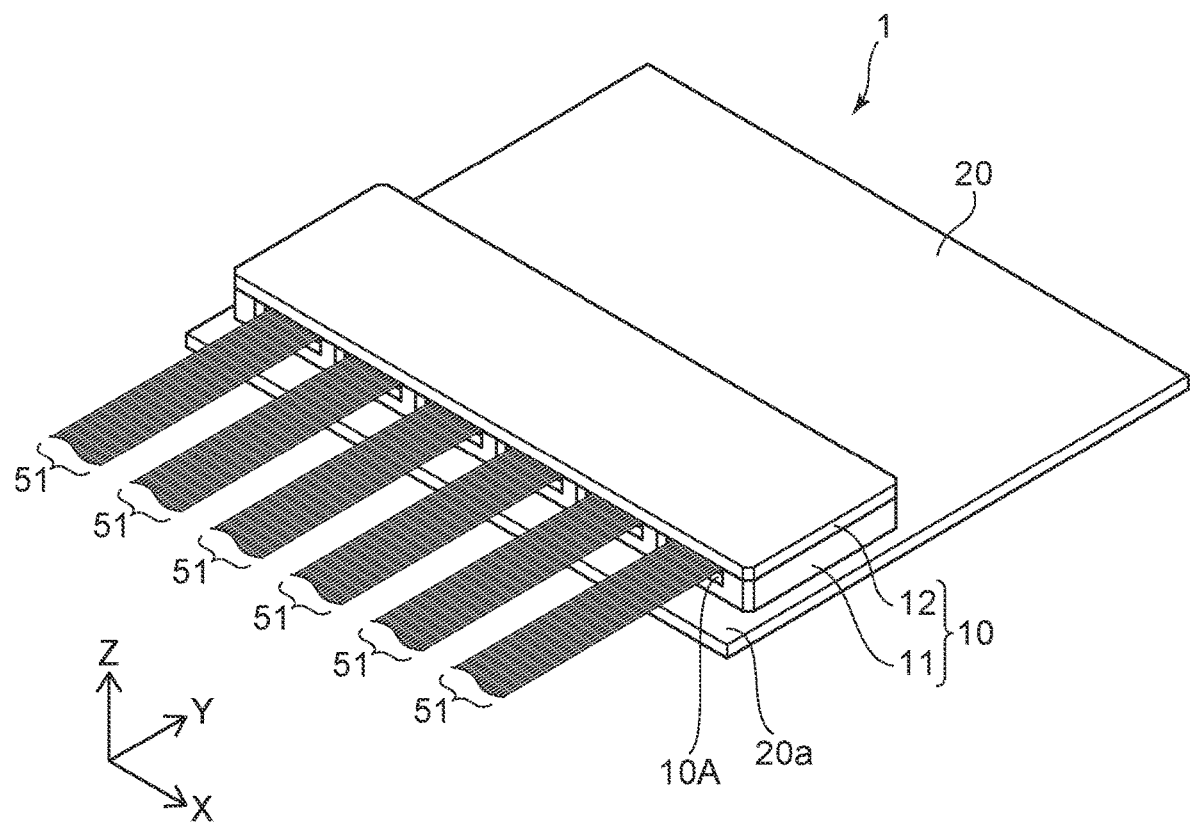
FIG. 1 is a schematic perspective view of a semiconductor device of an embodiment.

According to one embodiment, a semiconductor device includes a substrate; a holding member located on the substrate, the holding member including a module placement part and an opening arranged in a first direction; an optical module located in the module placement part and mounted on the substrate; and an optical fiber passing through the opening, the optical fiber being connected with the optical module. The holding member includes a first corner part and a second corner part. The opening is between the first corner part and the second corner part in a direction crossing the first direction. The first corner part and the second corner part are beveled.

Embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

The same or similar components are marked with the same reference numerals.

Figure 2:
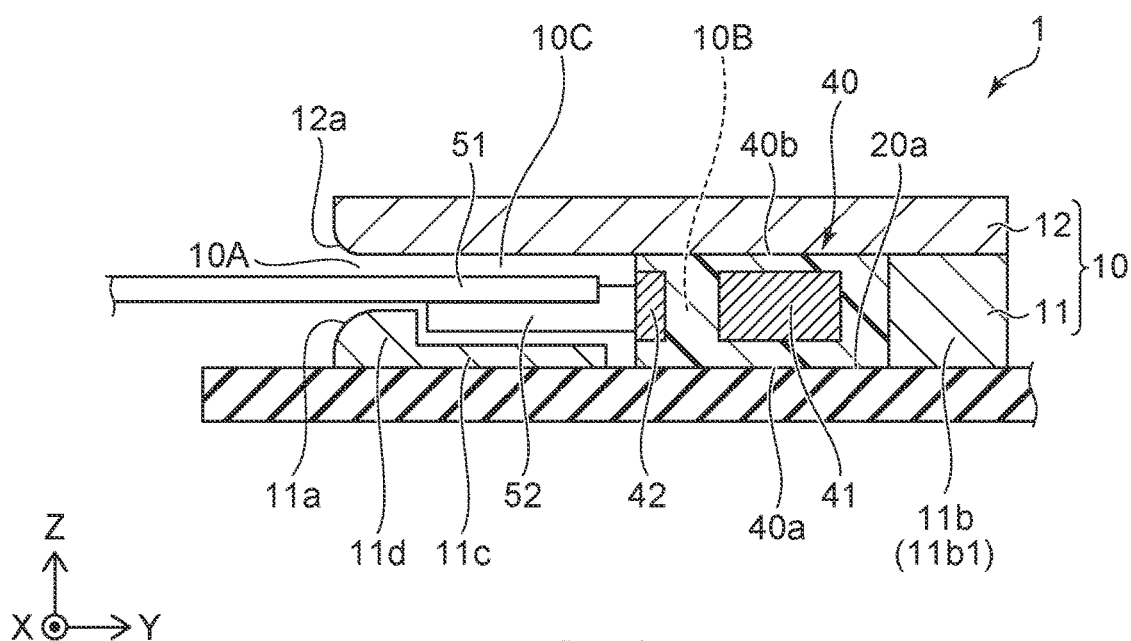
FIG. 2 is a schematic cross-sectional view of the semiconductor device of the embodiment.

As shown in FIGS. 1 and 2, a semiconductor device 1 of the embodiment includes a substrate 20, a holding member 10, an optical module 40, and an optical fiber 51.

The holding member 10 and the optical module 40 are located on a mounting surface 20a of the substrate 20. The substrate 20 is made of an insulative material. For example, a resin or ceramic can be used as the material of the substrate 20. Two directions that cross, e.g., are orthogonal to, each other in a plane parallel to the mounting surface 20a of the substrate 20 are taken as a first direction Y and a second direction X. A direction that crosses, e.g., is orthogonal to, the first direction Y and the second direction X is taken as a vertical direction Z. "Up" refers to the side at which the mounting surface 20a is located with respect to the substrate 20 in the vertical direction Z, or the direction in which the holding member 10 is located when referenced to the substrate 20. "Down" refers to the direction opposite to "up" in the vertical direction Z. The upper or lower surface of a component refers to the surface of the component at the upper side or the lower side. A side surface of the component refers to a surface of the component that includes the Z-direction.

The holding member 10 includes an opening 10A, a space 10C, and the module placement part 10B arranged in the first direction Y. Multiple spaces 10C are arranged in the second direction X; and multiple module placement parts 10B are arranged in the second direction X. The holding member 10 includes a first holding part 11 and a second holding part 12. For example, the module placement part 10B is formed as a space that is open upward in the first holding part 11. The second holding part 12 has a shape that extends in the first and second directions Y and X and covers the module placement part 10B from above. The opening 10A is positioned at the end part in the first direction Y of the holding member 10. The opening 10A is positioned between the end part in the first direction Y of the first holding part 11 and the end part in the first direction Y of the second holding part 12 in the vertical direction Z. The first holding part 11 and the second holding part 12 may be formed to have a continuous body.

Figure 3:
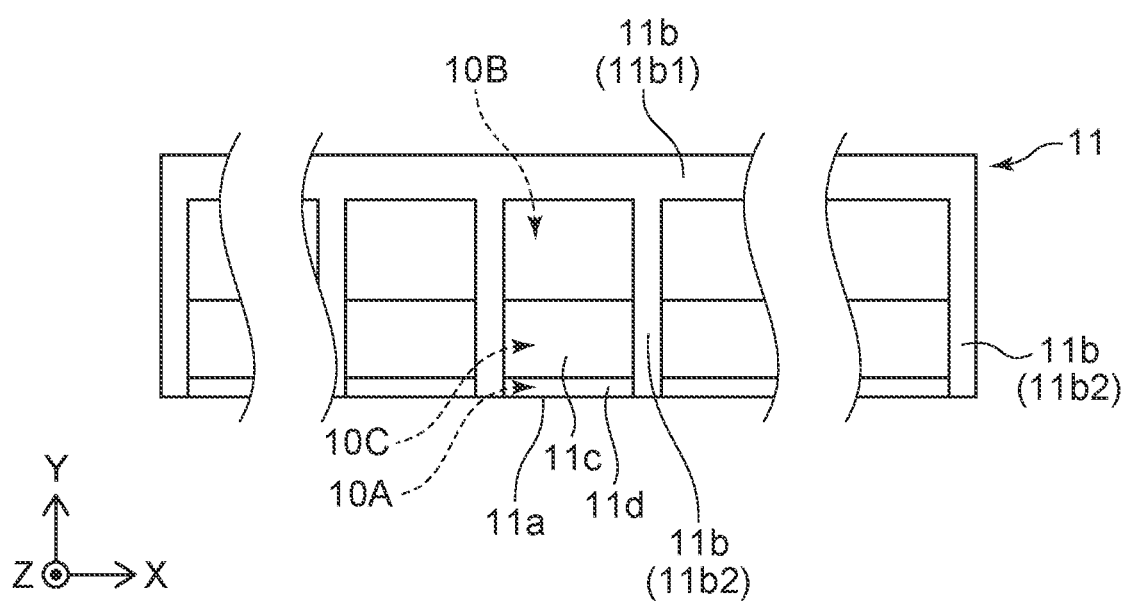
FIG. 3 is a schematic plan view of a first holding part of the embodiment.

FIG. 3 is a schematic plan view of the first holding part 11. The shape of a first corner part 11a is not illustrated in FIG. 3. The first holding part 11 includes a first thickness part 11b, a third thickness part 11c, and a second thickness part 11d and is fixed to the mounting surface 20a of the substrate 20.

The first thickness part 11b has a first thickness in the vertical direction Z. The first thickness part 11b contacts the substrate 20 and has, for example, a comb-shaped configuration that includes a component 11b1g extending in the second direction X and components 11b2 extending in the first direction Y. The second holding part 12 is supported on the first thickness part 11b at a prescribed spacing from the substrate 20. The space 10C and the module placement part 10B are positioned to be spatially connected.

The second thickness part 11d is positioned at the opening 10A side of the first holding part 11 in the first direction Y, and is positioned between the components 11b2 of the first thickness part 11b in the second direction X. The second thickness part 11d has a shape that extends in the second direction X, and has a second thickness in the vertical direction Z that is less than the first thickness. The second thickness part 11d contacts the substrate 20.

The third thickness part 11c is positioned between the second thickness part 11d and the module placement part 10B of the first holding part 11 in the first direction Y, and is positioned between the components 11b2 of the first thickness part 11b in the second direction X. The third thickness part 11c has a shape that extends in the first and second directions Y and X, and includes a third thickness in the vertical direction Z that is less than the second thickness. The third thickness part 11c contacts the substrate 20. The third thickness part 11c is included to reinforce the mechanical strength of the first holding part 11 and may be omitted according to the material properties, size, etc.

The module placement part 10B is formed as a through-part extending through the first holding part 11 in the vertical direction Z, is positioned between the third thickness part 11c and a component 11b1 of the first thickness part 11b in the first direction Y, and is positioned between the components 11b2 of the first thickness part 11b in the second direction X. Although an example is shown in FIG. 3 in which the multiple openings 10A are arranged in the second direction X and the multiple module placement parts 10B are arranged in the second direction X, there may be one opening 10A and one module placement part 10B.

The optical module 40 includes an optical element 42 that is optically coupled with the optical fiber 51, and a semiconductor element 41 that is electrically connected with the optical element 42. The optical element 42 is a light-receiving element that converts an optical signal from the optical fiber 51 into an electrical signal and transmits the electrical signal to the semiconductor element 41. Or, the optical element 42 is a light-emitting element that converts an electrical signal from the semiconductor element 41 into an optical signal and transmits the optical signal to the optical fiber 51. The semiconductor element 41 is, for example, an IC (Integrated Circuit) chip.

The optical fiber 51 extends in the first direction Y, passes through the opening 10A and the space 10C between the opening 10A and the module placement part 10B, and is connected with the optical module 40. For example, the optical fiber 51 is connected to the optical module 40 by an adhesive. The optical fiber 51 may be directly connected with the optical module 40, or may be connected with the optical module 40 by providing a lens 52 at the vicinity of the optical module 40. The optical fiber 51 may be a ribbon fiber bundle of multiple optical fibers. For example, the lens 52 is made of glass or a resin. As shown in FIG. 1, for example, multiple optical fibers 51 that are arranged in the second direction X can be connected to the optical module 40.

Multiple mounting pads are located at the mounting surface 20a of the substrate 20. The optical module 40 includes a terminal placement surface 40a facing the mounting surface 20a of the substrate 20. Multiple terminals that are electrically connected with at least the semiconductor element 41 are located at the terminal placement surface 40a.

The optical module 40 is pressed onto the mounting surface 20a of the substrate 20 by the lower surface of the second holding part 12 pressing on an upper surface 40b of the optical module 40. The electrical connection between the terminals located at the terminal placement surface 40a of the optical module 40 and the mounting pads located at the mounting surface 20a of the substrate 20 are ensured thereby. The terminals and the mounting pads may be in direct contact or may be electrically connected via an anisotropic conductive member. The optical module 40 can be detached from the module placement part 10B and replaced by detaching the second holding part 12 from the first holding part 11.

The holding member 10 includes the first corner part 11a and a second corner part 12a that are positioned so that the opening 10A is between the first corner part 11a and the second corner part 12a in the vertical direction Z. The first corner part 11a is positioned below the opening 10A in the vertical direction Z. The second corner part 12a is positioned above the opening 10A in the vertical direction Z. The first corner part 11a is positioned at the end part in the first direction Y of the first holding part 11. The second corner part 12a is positioned at the end part in the first direction Y of the second holding part 12.

The first corner part 11a and the second corner part 12a are beveled. For example, the first corner part 11a and the second corner part 12a include curved surfaces. In the example shown in FIG. 2, the first corner part 11a and the second corner part 12a are made of only curved surfaces and do not include edges. Damage of the optical fiber 51 can be prevented by beveling the first corner part 11a and the second corner part 12a because there are no sharp edges above and below the opening 10A and the optical fiber 51 does not strike an edge when the optical fiber 51 moves in the vertical direction Z. The connection points of the optical fiber 51, the lens 52, and the optical element 42 are positioned between the substrate 20 and the second holding part 12 in the vertical direction Z and are protected from contact with components outside the semiconductor device 1. The curved surfaces of the first and second corner parts 11a and 12a contact the optical fiber 51 when the optical fiber 51 is greatly bent in the vertical direction Z. In such a case, compared to when an edge is contacted, the stress on the optical fiber 51 from the first holding part 11 or the second holding part 12 can be reduced.

Figure 4A:
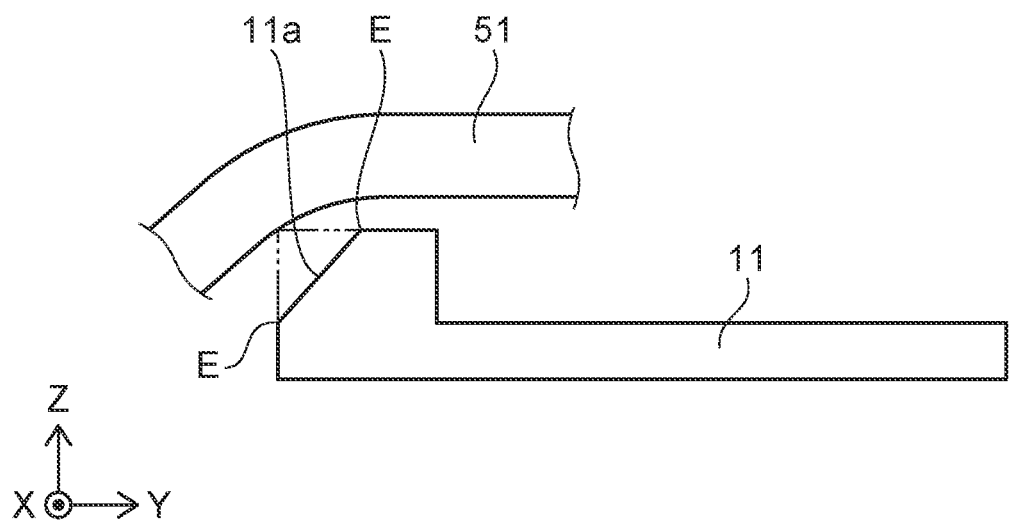
FIG. 4A and FIG. 4B are schematic cross-sectional views showing another example of a first corner part of the semiconductor device of the embodiment.

In the example shown in FIG. 4A, the first corner part 11a is beveled into a shape that includes a sloped surface sloped with respect to the vertical direction Z. A shape in which the first corner part 11a is not beveled is illustrated by a double dot-dash line in FIG. 4A. When the optical fiber 51 moves in the vertical direction Z, the optical fiber 51 undesirably strikes an unbeveled sharp edge if the first corner part 11a is not beveled; however, by beveling the first corner part 11a, the optical fiber 51 may be prevented from contacting the first holding part 11, and damage of the optical fiber 51 can be prevented. Or, by beveling the first corner part 11a and the second corner part 12a to form multiple obtuse edges, the stress on the optical fiber 51 from the edges can be reduced even when the optical fiber 51 contacts the first holding part 11 or the second holding part 12; and damage of the optical fiber 51 can be prevented.

Figure 4B:
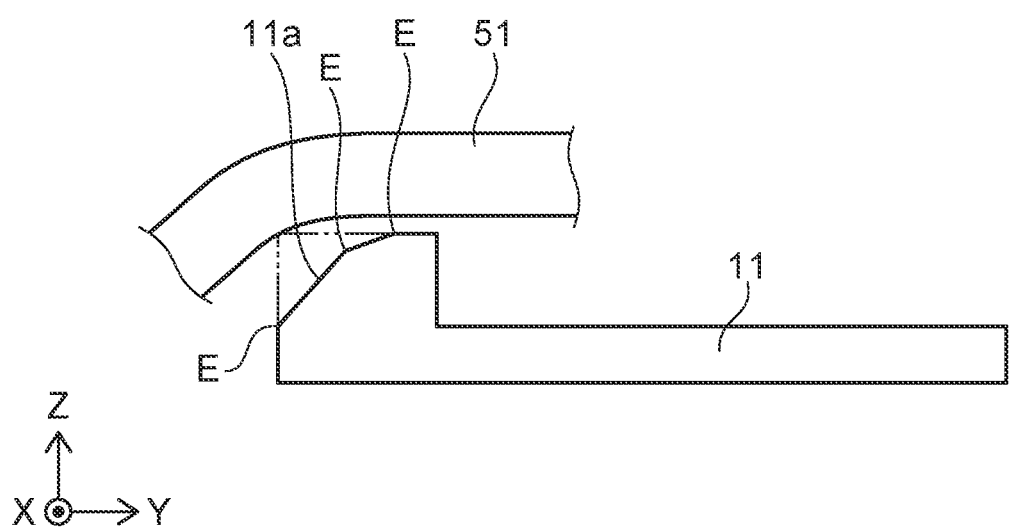

As shown in FIG. 4B, the first corner part 11a may be beveled into a shape that includes multiple sloped surfaces sloped with respect to the vertical direction Z. In FIG. 4B, the shape in which the first corner part 11a is not beveled is illustrated by a double dot-dash line.

When the first corner part 11a is beveled into a shape that includes sloped surfaces, obtuse edges E are formed at the boundaries between the sloped surfaces and the other surfaces. The number, angles, and area of the beveling is set so that the optical fiber 51 does not strike the edges E when the optical fiber 51 has the maximum bend without breaking. Or, the number of bevels, the bevel angles, and the beveling area are set so that the optical fiber 51 contacts the obtuse edges E at one or more points without breaking when the radius of the optical fiber 51 is not more than the radius of the maximum bend of the optical fiber 51. Compared to the case without beveling, the stress received when the optical fiber 51 contacts the first holding part 11 or the second holding part 12 can be reduced thereby, and damage of the optical fiber 51 can be prevented.

The second corner part 12a also may be beveled into a shape that includes a sloped surface similarly to the first corner part 11a shown in FIG. 4A or FIG. 4B. The first corner part 11a and the second corner part 12a each may be beveled into shapes that include both curved surfaces and sloped surfaces.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A semiconductor device, comprising:
    a substrate;
    a holding member located on the substrate, the holding member including a module placement part and an opening arranged in a first direction;
    an optical module located in the module placement part and mounted on the substrate; and
    an optical fiber passing through the opening, the optical fiber being connected with the optical module,
    the holding member including a first corner part and a second corner part, the first corner part and the second corner part facing the optical fiber at the opening,
    the opening being between the first corner part and the second corner part in a direction crossing the first direction, and
    the first corner part and the second corner part being beveled.

2. The device according to claim 1, wherein
    the first corner part and the second corner part include curved surfaces.

3. The device according to claim 1, wherein
    the first corner part and the second corner part include sloped surfaces.

4. The device according to claim 3, wherein
    the first corner part and the second corner part each include a plurality of sloped surfaces.

5. The device according to claim 1, wherein
    the holding member includes a plurality of the openings and a plurality of the module placement parts.

6. The device according to claim 1, wherein
    the direction crossing the first direction is perpendicular to a surface of the substrate, and
    the holding member and the optical module are located at the surface of the substrate.

7. The device according to claim 1, wherein
    the optical module includes:
        an optical element optically coupled with the optical fiber; and
        a semiconductor element electrically connected with the optical element.

8. The device according to claim 7, wherein
    the optical element is a light-receiving element that converts an optical signal from the optical fiber into an electrical signal and transmits the electrical signal to the semiconductor element.

9. The device according to claim 7, wherein
    the optical element is a light-emitting element that converts an electrical signal from the semiconductor element into an optical signal and transmits the optical signal to the optical fiber.

10. The device according to claim 1, wherein
    the optical fiber is connected with the optical module via a lens.

* * * * *